Patented May 11, 1948

2,441,422

UNITED STATES PATENT OFFICE 2,441,422

ORGANOSILICON-SILICA SOLS, GELS, AND AEROGELS

Robert H. Krieble and John R. Elliott, Schenectady, N. Y., assignors to General Electric Company, a corporation of New York No Drawing. Application February 10, 1945, Serial No. 577,342

13 Claims. (Cl. 260—29.6)

The present invention relates to novel organosilicon-silica sols and gels and to methods of preparing them. More particularly it is concerned with novel cosols and with novel solid products produced from such sols wherein the collodial portion of the sol contains silicon atoms which are attached to at least one hydrocarbon radical selected from the group consisting of lower alkyl and aryl radicals.

Silica sols and gels have previously been known. In general the sols have been prepared by suitably mixing a solution of water-glass and a solution of an appropriate salt or acid. On standing such sols form gels from which the liquid media may be removed to form porous dry or substantially dry gels. When no precautions are taken to preserve the original gel structure during the removal of the liquid phase, shrinkage takes place and the products are called xerogels. However, if the washed gel is confined in a pressure vessel and then heated until the liquid in the gel has reached a temperature at which the surface tension of the liquid is so small as to produce no substantial shrinkage of the gel when the vapor is allowed to escape and the vapor is then gradually released from the pressure vessel, the skeleton structure of the dried gel is preserved approximately in its original porous state. The term "aerogel" has been applied to this highly porous type of gel which is described, for example, in Patent 2,285,449, issued to Samuel S. Kistler. According to the Kistler patent, these aerogels are further distinguished from xerogels by the fact that when they are treated with water and subsequently dried in the usual manner, that is below the critical pressure and temperature conditions referred to hereinbefore, they shrink during the drying operation and are converted to xerogels.

The present invention is based on the discovery that new and useful silica sols and gels, particularly new and useful silica aerogels, may be prepared from salts of silicic acid and siliconic acids. The aerogel products are particularly characterized by a high degree of water-repellency and are thus easily distinguished from the prior art gels of this type. Thus, since an aerogel prepared in accordance with the present invention is not wetted by water, it differs from previously known aerogels in that it is not subject to any substantial shrinkage when brought into contact with or immersed in water and thereafter subjected to an elevated temperature at pressures below the critical pressure. On the other hand, when the aerogels of the present invention are brought into contact with a liquid, such as alcohol, which will wet them and the liquid subsequently removed at temperatures and pressures below its critical value, the aerogel is subject to shrinkage and reverts to a xerogel.

The organo-silicon component of the cosols is preferably derived from an alkali siliconate (i. e., an alkali-metal salt of a hydrocarbon-substituted silanetriol), particularly a sodium siliconate containing a lower alkyl or aryl group as the organic radical attached to the silicon atom. These siliconates can be obtained for example by dissolving a mono-organo-polysiloxane in an aqueous or aqueous alcoholic solution of an alkali hydroxide as is more fully described in the copending application Serial No. 577,341, filed concurrently herewith in the names of John R. Elliott and R. H. Krieble, and assigned to the same assignee as the present invention. Briefly described, the preferred method of preparation comprises the hydrolysis of a suitable mono-organo silicon trichloride or other mono-organo silane containing three hydrolyzable groups and one lower alkyl or aryl radical attached to the silicon atom and the subsequent solution of the hydrolysis product in an aqueous or aqueous alcoholic solution of an alkali hydroxide in the ratio of at least about one mol alkyl hydroxide per atom of silicon, thereby to form a solution comprising an alkali-metal salt of a hydrocarbon-substituted siliconic acid, e. g., methyl siliconic acid.

The novel siliceous sols and gels composed of co-condensed silicic acid and one or more siliconic acids with or without more highly substituted silicon compounds may be prepared from these alkali organosilicon compounds and waterglass or equivalent alkali silicate in various ways. For example, solutions of water glass and an alkali siliconate or an alkali siliconate and an alkali salt of a silanediol (alkali siliconeate) in various proportions may be mixed with an acid or an acid salt which will liberate the siliconic acid and silicic acid in colloidal form. These sols may be employed as stiffening agents for cloth, paper, etc., or as bonding agents for fibrous mats, papers, bentonite films, etc. Any acid or salt or ion-exchange body suitable for the preparation of ordinary silica sols and gels may be employed in the practice of the present invention. The sols can be converted to gels, washed free of salts and thereafter dried slowly to form siliconic acid-silicic acid xerogels. Water-repellent aerogels can be obtained by confining the gels in a pressure vessel of such size that the liquid present in the gel is present in at least the amount required to fill the vessel at the critical density, heating the vessel and its contents until the pressure equals or exceeds the critical pressure, maintaining the pressure at or above the critical pressure of the liquid in the gel if necessary by removal of the liquid, continuing heating until the temperature equals or exceeds the critical temperature, and thereafter releasing the vapor above the critical temperature. The liquid component of the gel may be water or some organic liquid such as alcohol, ether, etc. Alternatively, the water-repellent aerogel may be prepared in the manner described in patent 2,285,449 Marshall, that is, by adding a quantity of a water-miscible organic liquid to the cosol prior to its conversion to a gel, removing the precipitated inorganic salts, and thereafter removing the liquid phase from the sol, following the same process as that employed in preparing aerogels, that is, by removing the liquid phase from the sol without substantially subjecting the sol to a compressive liquid-solid interface.

As has been previously stated, the aerogels composed of a mixture of silicon compounds including siliconic acid and silicic acid are highly water-repellent. Samples have been placed in boiling water for many hours without wetting. Pieces of the cogels evacuated under water and repressured under water show no impregnation. The highly developed water-repellency of these products coupled with their very low density, makes them particularly useful as buoyant fillers for life jackets, as well as for heat insulation, particularly in the presence of moisture or in moist atmospheres. Many of the products may, of course, be used as substitutes for ordinary silica gels in other well known applications such as catalyst or catalyst carriers.

In order that those skilled in the art may better understand how the present invention may be carried into effect the following illustrative examples are given:

Example 1

One hundred eighty-four cc. of a solution of waterglass 3.27 molar in $SiO_2$ and 1.96 molar in sodium hydroxide was mixed with 27.8 cc. of a 5.38 molar solution of sodium methyl siliconate and the mixture was run into 138 cc. of 3.70 N. $H_2SO_4$. The final pH was 4.55. 1,290 cc. of 95% ethyl alcohol was added and the precipitated sodium sulfate was removed by filtration. The filtrate was a clear sol stable for many hours. The sol was placed in an autoclave of 3-liter capacity and heated to 375° C. During the heating period, the pressure rose to 2,500 pounds per square inch at which point vapor was released at the top of the autoclave at such a rate as to maintain this pressure. The slow release of vapor at these temperatures and pressures required ½ hour. The pressure was then lowered by removal of vapor and the autoclave evacuated to a pressure of 30 mm. of mercury for an additional ½ hour after which the autoclave was cooled to 150° C. and opened. 1,500 cc. of translucent aerogel having a density of about 30 g./liter was obtained. This gel of cocondensed silicic acid and methyl siliconic acid was not wet by being placed in a beaker of boiling water for one hour. The evacuation step which removes the final traces of alcohol is not essential to the preperation of a useful aerogel.

Example 2

Fifty-nine cc. (0.2 mol) sodium ethyl siliconate was combined with 243 cc. (0.8 mol $SiO_2$) sodium silicate ($Na_2O \cdot 3.34$ $SiO_2$) and 110 cc. of water. The solution was run slowly with efficient stirring and external cooling into 94.5 cc. of 30 per cent $H_2SO_4$ until the pH of the solution was 4.5. 1600 cc. of 95 per cent ethanol was then added slowly and with stirring and the resulting alcosol filtered to remove precipitated sodium sulfate. The clear cosol was charged to an autoclave and subjected to heat and pressure to make an aerogel by the process previously outlined in Example 1. A water-repellent aerogel having a density of 0.033 gram per cc. was obtained.

Example 3

Sixty-nine cc. of 2.9 molar potassium phenyl siliconate (0.2 mol of siliconate) was mixed with a solution of 160 g. sodium metasilicate pentahydrate (0.8 mol silicate) dissolved in 200 cc. of water. This solution was poured slowly with stirring into 160 cc. (0.5 mol) of 30 per cent sulfuric acid in 1600 cc. of 95 per cent ethanol to obtain a sol having a pH of 5.8. The precipitated sodium sulfate was removed by centrifugation, yielding a slightly opalescent sol. On standing overnight the sol deposited a small amount of solid material. The sol was charged to an autoclave and heated under pressure as previously described. The product was a very light, fluffy and water-repellent powder which had a density of 0.067 gram per cc.

In general the relative proportion of alkali siliconate necessary to obtain a water-repellent product will depend to some extent on the particular process employed in the manufacture of the cogel. Microporous xerogels have been made from silicic acid and siliconic acid in all proportions, those containing a fair proportion of siliconic acid being highly water-repellent. When the cogel is prepared directly from the alcosol or some other organosol as described in the foregoing examples, at least 10 and preferably about 20 mol per cent of the siliconate based on the total silicon should be employed, that is at least 10 and preferably 20 per cent of the total number of silicon atoms in the sol should be attached to hydrocarbon radicals. For best results, the pH of the aquasol should be at least 3, preferably from 4 to 6, before addition of the alcohol or other water-miscible solvent in order to obtain maximum water-repellency.

Water-repellent aerogels can be made with much smaller proportions of siliconic acid by a procedure which comprises adding an acid to a mixture of alkali siliconate and alkali silicate, gelling the colloid, extracting the soluble salts from this gel and thereafter removing the liquid phase from the gel under conditions such that no substantial shrinkage takes place. By this method water-repellent gels have been obtained with as little as 1 to 2 mol per cent of alkali siliconate based on the total silicon content of the sol when the aquagel was formed at a pH of from 3 to 7, preferably between 4 and 6.

Example 4

A solution containing 0.49 mol of $SiO_2$ in the form of water-glass and 0.01 mol sodium methyl siliconate was made by mixing 150 cc. of a solution of water-glass 3.27 molar in $SiO_2$ and 1.96 molar in NaOH with 9.0 cc. of a 1.114 molar solution of sodium siliconate and 732 cc. water. To this was added about 140 cc. of 2.10 normal $H_2SO_4$, the addition being stopped when a pH of 4.5 was reached. The solution gelled in about 1½ hours. After aging 15 hours the gel was broken up, continuously extracted with distilled water for 24 hours, and then with alcohol for an additional 15 hours. The alcogel so formed was autoclaved at 375° and 2,500 pounds per square inch and finally evacuated as described in the above examples. A slightly turbid aerogel was obtained which floated without wetting on cold water.

The method of neutralization comprising the addition of acid to the mixed salts as described in Example 4 is not particularly adaptable to the organosol process described in Examples 1 to 3, inasmuch as with the more concentrated aqueous solutions, gellation occurs before the addition of acid is completed. This usually ocurs at a pH of from 6—8. A preferred method of neutralization, whereby water-repellent aerogels can be obtained by the use of alkali siliconates in mol ratios substantially less than 10 to 20 mol per cent, comprises a modification of the organosol process. The following example illustrates this modification, in which a portion of the acid insufficient to cause gellation during processing, is added to the alkaline solution and the resultant solution added to the remaining acid to produce an aquasol of a pH of at least 3, preferably 4—6.

*Example 5*

A solution containing 0.713 mol of $SiO_2$ and 0.037 mol of siliconate was made by mixing 218 cc. of a solution of water-glass of composition $Na_2O \cdot 3.34\ SiO_2$ and 3.27 molar in $SiO_2$ with 6.9 cc. of 5.38 molar sodium methyl siliconate, and 100 g. of ice. Twenty cc. of 7.08 N. $H_2SO_4$, which was about ⅓ of the total acid employed, was rapidly run into this solution with violent stirring, the final temperature being 5° C. The clear sol so obtained was run into an additional 44 cc. of 7.08 N. $H_2SO_4$ to give a sol of pH 4.0. 1,250 cc. of 95% alcohol was added and the precipitated salt removed by filtration. The sol was autoclaved and evacuated as described in previous examples. A soft but strong, water-repellent aerogel was obtained which was not wet in ½ hour by boiling water. Gels thus prepared have been found to have densities as low as 1.5 pounds per cubic foot.

It has been found that the advantages obtained by mixing the acid and alkaline solution as described in Example 5 may also be obtained by an alternative method in which the mixture of alkali siliconate and water-glass is aged prior to the neutralization thereof in accordance with the process of Example 4. Apparently during this aging period, which is at least a matter of days, some interaction of the siliconate and water-glass takes place which renders the siliconate more effective insofar as the development of the water-repellent properties of the final product is concerned. The following example illustrates this process:

*Example 6*

A mixture of 324 grams water-glass (29 per cent $SiO^2$ and 9 per cent $Na_2O$) containing 1.575 mols $SiO_2$ and 28.9 grams of an aqueous solution of 0.074 mols alkali siliconate was aged at room temperature for 10 days. The aged solution was then diluted with an equal part of water and poured into 153 g. $H_2SO_4$ to form a sol of pH 4.5. 1400 g. alcohol was added to form an alcosol of pH 5.3. The sol was filtered to remove the precipitated salts and autoclaved. A water-repellent aerogel comparable with the products of Example 5 was obtained.

It is not necessary to use alkali salts of pure siliconic acid in the preparation of the cogels. Appreciable amounts of the alkali solutions of the silicones, for example of the dimethyl, diethyl, diphenyl silicones probably containing alkali salts of the corresponding silanediols may also be incorporated. These may be prepared separately and mixed with the alkali siliconate-alkali silicate mixture or they may be prepared along with the alkali siliconate from the products obtained by hydrolyzing a mixture of hydrocarbon-substituted silanes containing two and three hydrolyzable groups, such as halogen atoms, connected to the silicon. Examples of suitable silanes containing two hydrolyzable groups are dimethyldichlorosilane, methyldichlorosilane, diethyldibromosilane, diethyldiethoxysilane, diphenyldichlorosilane, etc. Disilane compounds, such as symmetrical dimethyltetrachlorodisilane or tetramethyldichlorodisilane, which on alkaline hydrolysis undergo cleavage of the Si–Si bond may also be employed as the source of the alkali siliconate or the alkali salts of the silanediol.

The following example describes the preparation of cosols and cogels from alkali salts including those of a silanediol.

*Example 7*

Twenty-five and nine tenths pounds of a mixture of 87 weight per cent methyltrichlorosilane and 13 weight per cent dimethyldichlorosilane was run rapidly beneath the surface of 25 gallons of a stirred slurry of crushed ice and water. The hydrolysis product separated as an amorphous solid which was dissolved in a solution of 8.3 pounds U. S. P. sodium hydroxide.

Ten volumes of this solution was mixed with 288 volumes water-glass (29 per cent in $SiO_2$) and 133 volumes of water. The resultant mixture contained 5 mol per cent of its silicon atoms attached to one or two hydrocarbon radicals. 29.6 volumes 30 per cent $H_2SO_4$ was added to this mixture and this solution was then added, with external cooling, to 56 volumes of 30 per cent $H_2SO_4$ until the pH of the solution was 4.62. 1500 volumes of 95% ethanol was added slowly and the precipitated sodium sulfate was removed by filtration. The alcosol was confined in a pressure vessel and treated as in Example 5. The aerogel formed was water-repellent.

*Example 8*

Another method of making a water-repellent aerogel from the materials employed in the previous examples comprises forming an aquagel from water-glass and an acid, washing the gel with water to remove the inorganic salts, and then with alcohol to replace the water. The alcohol is then replaced by an alcosol of siliconic acid prepared, for example, by adding sodium methyl siliconate to alcoholic sulfuric acid and removing the precipitated salts. On autoclaving the sol-impregnated gel, for example, by the process described in Example 1, water-repellent aerogel is obtained.

While the cosols and cogels specifically described in the above examples were made with from 1 to 20 mol per cent of the alkali-silicon compounds, it is to be understood that the invention is not limited to this range of proportions. As the mol ratio of siliconate is increased some loss in strength of the gels may be noted. However, satisfactory cosols and cogels have been prepared from mixtures containing as much as 50 mol per cent of the siliconate. Higher ratios may be employed although from the standpoint of relative cost of the siliconates, silanediol salts (alkali siliconeates) and the silicates, no advantage is seen in employing the siliconates or silanediol salts in mol ratios substantially exceeding that necessary to obtain a water-repellent gel.

What we claim as new and desire to secure by Letters Patent of the United States is:

1. The method for making a sol which comprises (1) forming an aqueous solution of a mixture of silicon compounds containing (a) from 50 to 99 mol per cent of an alkali-metal silicate and (b) from 1 to 50 mol per cent of a water-soluble alkali-metal salt of a hydrocarbon-substituted siliconic acid, and (2) adding the solution mixture in (1) to an acid to obtain an acidic sol.

2. A sol prepared in accordance with the method disclosed in claim 1.

3. The method for preparing a sol which comprises forming an aqueous mixture of silicon compounds including from 50 to 99 mol per cent sodium silicate and from 1 to 50 mol per cent of an alkali-metal salt of methyl siliconic acid, adding said solution to an acid to obtain the sol of said silicon compounds having a pH of from 3 to 6.

4. The method for making a gel which comprises (1) forming an aqueous solution of a mixture of silicon compounds including (a) from 50 to 99 mol per cent of an alkali-metal silicate and (b) from 1 to 50 mol per cent of a water-soluble alkali-metal salt of a hydrocarbon-substituted siliconic acid, (2) adding the solution mixture in (1) to an acid to obtain an acidic sol, and (3) converting said sol to a gel.

5. A gel prepared in accordance with the method disclosed in claim 4.

6. The method for preparing an aerogel which comprises forming an aqueous solution of ingredients comprising from 1 to 50 mol per cent of an alkali-metal salt of methyl siliconic acid and from 50 to 99 mol per cent of an alkali-metal silicate, adding to said solution a quantity of acid insufficient to cause gelation thereof, adding the resultant product to an additional quantity of acid sufficient to obtain a sol having a pH between 4 and 6, and coverting said sol to an aerogel.

7. An aerogel prepared in accordance with the method described in claim 6.

8. The method for preparing a water-repellent aerogel which comprises (1) forming an aqueous solution of a mixture of silicon compounds containing from 50 to 99 mol per cent of an alkali-metal silicate and from 1 to 50 mol per cent of an alkali-metal salt of methyl siliconic acid, (2) adding said solution to an acid to obtain an acidic sol of said silicon compounds having a pH of from 3 to 6, (3) converting said sol to a gel, and (4) removing the liquid phase from the said gel at a pressure above the critical pressure and at a temperature at least equal to the critical temperature of the said liquid phase.

9. A water-repellent aerogel prepared in accordance with the method described in claim 8.

10. The method of preparing a water-repellent aerogel which comprises forming an aqueous solution containing from 1 to 50 mol percent of an alkali-metal salt of methyl siliconic acid and from 50 to 99 mol per cent of an alkali-metal silicate, adding said solution to a solution of an acid in such proportions as to obtain an aquasol having a pH of at least 3 and not more than 6, adding to said aquasol a quantity of water-miscible alcohol, removing the precipitated inorganic salts and thereafter removing the liquid phase from said sol at a pressure above the critical pressure and at a temperature at least equal to the critical temperature of said liquid phase.

11. The method for preparing an aerogel which comprises forming an aqueous solution containing from 1 to 50 mol per cent sodium methyl siliconate and from 50 to 99 mol per cent of sodium silicate, adding to said solution about one-third the quantity of acid calculated as necessary to lower the pH thereof from 4 to 6, adding the resultant product to the remaining acid to obtain a sol having a pH of from 4 to 6, adding to the sol a quantity of alcohol, removing the precipitated inorganic salts, and thereafter removing the liquid phase from the said sol at a pressure above the critical pressure and at a temperature at least equal to the critical temperature of the said liquid phase of the said sol.

12. The method for preparing a water-repellent aerogel which comprises (1) forming an aqueous solution of a mixture of silicon compounds containing from 50 to 99 mol per cent of an alkali-metal silicate and from 1 to 50 mol per cent of an alkali-metal salt of ethyl siliconic acid, (2) adding said solution to an acid to obtain an acidic sol having a pH of from 3 to 6, (3) converting said sol to a gel, and (4) removing the liquid phase from the said gel at a pressure above the critical pressure and at a temperature at least equal to the critical temperature of the said liquid phase.

13. The method for preparing a water-repellent aerogel which comprises (1) forming an aqueous solution of a mixture of silicon compounds containing from 50 to 99 mol per cent of an alkali-metal silicate and from 1 to 50 mol per cent of an alkali-metal salt of phenyl siliconic acid, (2) adding said solution to an acid to obtain an acidic sol having a pH of from 3 to 6, (3) converting said sol to a gel, and (4) removing the liquid phase from the said gel at a pressure above the critical pressure and at a temprature at least equal to the critical temperature of the said liquid phase.

ROBERT H. KRIEBLE.
JOHN R. ELLIOTT.

REFERENCES CITED

The following references are of record in the file of this patent:

UNITED STATES PATENTS

| Number | Name | Date |
|---|---|---|
| 2,093,454 | Kistler | Sept. 21, 1937 |
| 2,258,218 | Rochow | Oct. 27, 1941 |
| 2,285,449 | Marshall | June 9, 1942 |
| 2,408,656 | Kirk | Oct. 1, 1946 |

FOREIGN PATENTS

| Number | Country | Date |
|---|---|---|
| 55,899 | Russia | Oct. 31, 1939 |

OTHER REFERENCES

Stock, "Berichte Deut. Chem. Gesil.," Vol. 52, 1919, pages 695 and 708.

Rochow, "Chemistry of the Silicones," Wiley 1946, page 93.

Gordon et al., "The Biochemical Journal," 1943, vol. 37, pages 79 and 80.

Rochow, "Journ. Amer. Chem. Soc.," vol. 63, pages 798 to 800, 1941.

Meads et al., J. Chem. Soc. (London) vol. 105, pp. 679–90 (1914).

Meads et al., J. Chem. Soc. (London) vol. 107, pp. 459–68 (1915).

Andrianov: J. Gen. Chem. U. S. S. R., vol. 8, pp.1255–1263 (1938).